Feb. 14, 1950

C. DRILL 2,497,590

EMERGENCY PLANE CARRIER

Filed April 12, 1946

INVENTOR
CHARLES DRILL
By Ben V. Zillman
ATTORNEY

Patented Feb. 14, 1950

2,497,590

UNITED STATES PATENT OFFICE 2,497,590

EMERGENCY PLANE CARRIER

Charles Drill, St. Louis, Mo., assignor to Emma M. Drill, St. Louis, Mo.

Application April 12, 1946, Serial No. 661,615

2 Claims. (Cl. 244—139)

This invention relates to a device that is intended to be carried as part of the equipment of an airplane or the like, so that it normally remains out of service, but is readily available in an emergency, to rise a predetermined distance above the airplane and thence transport the latter in any direction to the best point of landing.

The invention has among its objects, the production of such a device that will be relatively compact so as to occupy a minimum of loading space of the airplane when placed within the latter, that will be sufficiently strong and powerful to easily carry the load of the airplane and its contents, and which will be otherwise satisfactory and efficient for use wherever found suitable.

One of the principal objects of my invention is to so construct a device of the kind described, that the same will have as a component element thereof, a rotary helicopter blade, to thereby enable the device to lift directly upwardly from its point of storage within the airplane, and with a minimum loss of time in so doing.

Another object of my invention is to make such an emergency device self-contained as a flying unit, having its own power plant, flight-sustaining parts, and guide means, so that it is in effect an auxiliary flying unit secondary to the flying unit on which it is mounted.

An added object of the invention is to so construct such a mechanism that said helicopter blade will be connected directly to the power plant for driving the same, but having in connection therewith adjustable means whereby the blade may be retained normally in inoperative position so as to occupy a minimum of floor space, but is manipulatable by the operator to a substantially vertical rotational axis to the operative flight position of the unit.

A still further object of my invention is to so arrange the operator's seat within such a device, that he will be in a position to control the flight of the unit and the load carried by the same.

Many other objects and advantages of the construction herein shown and described, and the uses mentioned, will be obvious to those skilled in the art to which this invention appertains, as will be more clearly apparent from the disclosures herein given.

To this end, my invention consists in the novel construction, arrangement and combination of parts herein shown and described, and as will be more clearly pointed out in the claims hereunto appended.

Figure 1:
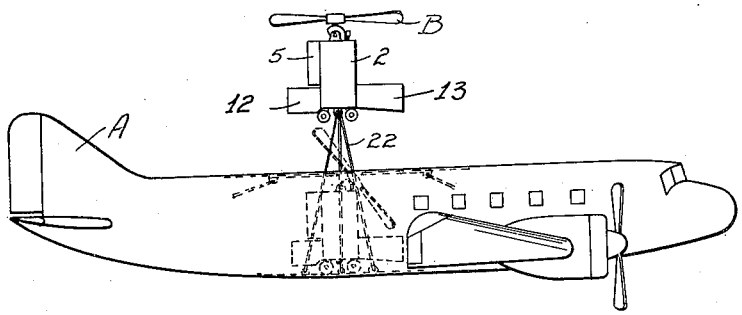
Figure 2:
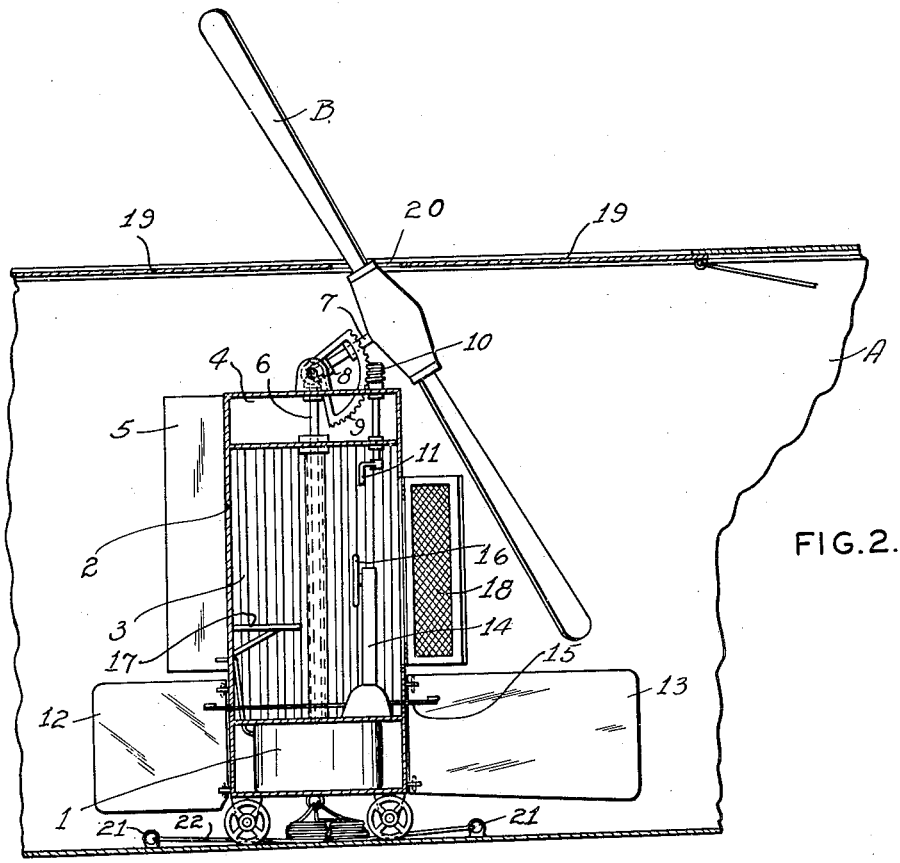

In the drawings, wherein like reference characters represent like or corresponding parts throughout the views, Figure 1 is a side elevation of an airplane being carried in flight by said emergency device; and Figure 2 is a vertical elevation of the emergency unit in normal inoperative position within the airplane, with the adjacent parts of the latter and some of the unit structure itself shown in cross-section.

Referring more particularly to the drawings, wherein I have illustrated a preferred embodiment of my invention, A represents an airplane of any desired size, shape and construction, it being understood that the same is furnished with a suitable power plant for enabling flight of the same and for directing and guiding it in said flight.

It sometimes happens that there is a complete failure of the power plant of the airplane, and if this occurs or anything else happens that causes the airplane to fail to respond to control and flight in the desired path, or for the estimated time that it would take to reach a point of safety or landing, disastrous accidents can result, and it is for the purpose of avoiding such accidents that I employ an emergency flying unit to be normally stored and inactive within the airplane, but readily available for service when needed, to carry the load of the plane and its passengers and cargo or parts and fly the latter in the path and to the destination at which the load can be landed in safety.

To this end, I have constructed my emergency device as a self-contained flying unit, with all necessary controls and devices for flying, and in order to conserve floor space, this device is made of a minimum transverse shape and area, and slightly elongated vertically, somewhat as is shown, and is normally stored within a compartment somewhere adjacent the point of equilibrium of the airplane, so that when the device carries the loaded plane, the latter will be fairly well balanced and the control of flight of the emergency unit so loaded, will be easier.

Any suitable power plant, such as the internal combustion engine or motor 1 shown, is arranged within a casing or housing 2, said engine being provided with the usual and necessary co-operating elements such as the cooling system 3 receiving its cooling medium from the tank 4 in any well-known manner, and the fuel-storage tank 5 for communication with said engine.

A helicopter rotor or blade B is operably connected to the shaft 6 driven by the engine 1, and in order that said blade may be normally kept within the minimum of projected floor area, it is normally kept in a position somewhat as indicated, so that its rotational axis is not vertical coincidental with that of the shaft 6. The shaft section 7 to which the rotor is secured is connected to the main shaft 6 through a universal joint 8 or the like so that the drive from the shaft 6 will always be transmitted through the section 7 to drive the rotor blade.

In order to actuate the shaft section 7 into vertical alignment with the main shaft 6, through the angular arc required, I have provided a control through a rack segment 9 carried by the shaft section 7, engaging with the worm 10 fixed to the casing 2 and operably controlled by means of a handle 11 or the like.

In order to control flight laterally, one or more vanes or rudders 12 and 13 may be provided by securement to the casing, there being a control post or stanchion 14 through which the tillers 15 having their ends connected to said vanes are threaded, and controlled by the handle of wheel 16.

A seat 17 may be provided within the housing or casing, for the convenience of the operator, and it will be noted that all of the various controls are within reach of the operator so seated.

A door 18 may be provided for entry into and exit from the housing, and this door may be provided with a grille or screen for free flow of air thereinto, if desired.

If it is desired that a smaller opening through the airplane ceiling be present than that necessary when the blade is horizontal and projected therethrough, one or more panels 19 may be provided immediately under the ceiling of the airplane, the same being slidable to reduce or enlarge the opening 20 through said ceiling.

One or more rings or anchor points 21 may be fixed to the airplane, as to the floor of the same, so that they may be secured to the ends of one or more cables or other flexible connections 22 connected to the emergency unit, as for example to the base of the latter. For obvious reasons, it is preferred that the securement to the airplane be at such point or points that when the latter is lifted by said cable or cables the airplane will be suspended at approximately the point of equilibrium or of the center of gravity of the airplane and render the guiding easier.

Assuming that it is necessary to use the emergency unit to fly the airplane to a predetermined landing point, and with the cables secured to the rings in the airplane, the operator gets into the housing, after first having opened the top panels to full opening, and then manually adjust the rotor until its rotational axis is vertical. The motor is started, and the initial portion of the flight will be vertical, until it is limited by the length of the connecting cables, and at which time the unit will be slightly above the airplane, somewhat as indicated in Fig. 1.

In this position, the emergency unit will sustain the airplane and its cargo in flight, and the operator within the unit then guides and directs the same to the landing field or point deemed advisable under the circumstances.

Having thus described my invention, it is obvious that various immaterial modifications may be made in same without departing from the spirit of the invention; hence I do not wish to be understood as limiting myself to the exact form, shape, construction and combination of parts herein shown and described, or the uses mentioned, except as limited by the state of the art to which this invention appertains, and the claims hereunto appended.

What I claim as new and desire to secure by Letters Patent is:

1. The combination with an airplane, of a pilot-receiving emergency carrier therefor comprising a self-contained motor driven flying unit normally mounted within said airplane, means in said unit to receive said pilot during operation of said unit, means for operating said unit to initially fly it together with its motor to a predetermined distance above said airplane and thence direct it in any direction, and a load-transmitting connecting means between said airplane and unit and limiting the vertical separation of the latter relatively of the former.

2. In an emergency airplane carrier adapted to be normally carried in inoperative position within an airplane, an auxiliary internal combustion auxiliary engine as a source of power independent of the airplane power unit, a housing about said auxiliary engine, a rotary helicopter blade drivingly connected to said engine and normally in inoperative lifting position exteriorly of said housing, means for controlling steering of said carrier in flight, an operator's seat within said housing and so positioned that the operator thereon can operatively reach and control the flight of said carrier, and a flexible means interconnecting said airplane and carried and restricting relative movement therebetween to a predetermined amount and whereby said carrier together with its auxiliary engine and housing may be initially directed to a point a predetermined distance above the airplane upon operation of the carrier before the load of the airplane is carried by said carrier.

CHARLES DRILL.

REFERENCES CITED

The following references are of record in the file of this patent:

UNITED STATES PATENTS

| Number | Name | Date |
|---|---|---|
| 926,804 | Brown | July 6, 1909 |
| 1,019,988 | Mullendore | Mar. 12, 1912 |
| 1,379,522 | Bruner | May 24, 1921 |
| 2,227,204 | Sepko | Dec. 31, 1940 |
| 2,366,321 | Ferro | Jan. 2, 1945 |

FOREIGN PATENTS

| Number | Country | Date |
|---|---|---|
| 425,351 | France | Apr. 3, 1911 |